United States Patent
Tsai et al.

(10) Patent No.: US 11,941,210 B2
(45) Date of Patent: Mar. 26, 2024

(54) SENSING CIRCUIT IMPROVING MAGNIFICATION IN PIXEL CIRCUIT AND REDUCING INFLUENCE OF SHIFT IN THRESHOLD VOLTAGE PRELIMINARY CLASS

(71) Applicant: InnoLux Corporation, Miao-Li County (TW)

(72) Inventors: Ya-Li Tsai, Miao-Li County (TW); Hui-Ching Yang, Miao-Li County (TW); Yang-Jui Huang, Miao-Li County (TW); Te-Yu Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/057,290

(22) Filed: Nov. 21, 2022

(65) Prior Publication Data
US 2023/0205370 A1    Jun. 29, 2023

(30) Foreign Application Priority Data
Dec. 27, 2021   (CN) .......................... 202111618172.1

(51) Int. Cl.
*G06F 3/044*   (2006.01)
(52) U.S. Cl.
CPC .................................. *G06F 3/044* (2013.01)
(58) Field of Classification Search
CPC ................................ G06F 3/041; G06F 3/044
USPC ...................................... 345/76–89, 173–174
See application file for complete search history.

(56) References Cited

U.S. PATENT DOCUMENTS

| | | | |
|---|---|---|---|
| 8,928,053 B2 * | 1/2015 | Kurokawa | H04N 25/778 257/292 |
| 10,423,286 B1 | 9/2019 | Cheng | |
| 2002/0024058 A1 | 2/2002 | Marshall et al. | |
| 2005/0185078 A1 | 8/2005 | Segura-Puchades | |
| 2016/0064443 A1 * | 3/2016 | Inoue | H01L 29/7869 257/43 |
| 2017/0256207 A1 * | 9/2017 | Takahashi | G09G 3/3233 |
| 2018/0040274 A1 * | 2/2018 | Kurokawa | G09G 3/3677 |
| 2018/0249109 A1 | 8/2018 | Yang et al. | |

(Continued)

FOREIGN PATENT DOCUMENTS

| | | | | |
|---|---|---|---|---|
| CN | 103456267 A | * | 12/2013 | ........... G06F 3/0412 |
| TW | 201939244 A | | 10/2019 | |

(Continued)

OTHER PUBLICATIONS

Chinese language office action dated Jul. 17, 2023, issued in application No. TW 111123163.

*Primary Examiner* — Kwin Xie
(74) *Attorney, Agent, or Firm* — McClure, Qualey & Rodack, LLP

(57) ABSTRACT

A detection circuit is provided herein, which includes a first transistor, a second transistor, a third transistor, a light sensor, a capacitor, and a fourth transistor. The first transistor has a control terminal, a first terminal, and a second terminal. The second transistor is coupled to the control terminal. The third transistor is coupled to the control terminal and the second terminal. The light sensor is coupled to the control terminal. The capacitor is coupled to the control terminal. The fourth transistor is coupled to the second terminal.

18 Claims, 6 Drawing Sheets

(56) References Cited

U.S. PATENT DOCUMENTS

2019/0313048 A1 10/2019 Cheng et al.
2021/0056905 A1 2/2021 Liu et al.

FOREIGN PATENT DOCUMENTS

| WO | WO-2015180373 A1 | * | 12/2015 | ............. | G06F 3/041 |
| WO | WO-2016011707 A1 | * | 1/2016 | ............. | G06F 3/042 |

* cited by examiner

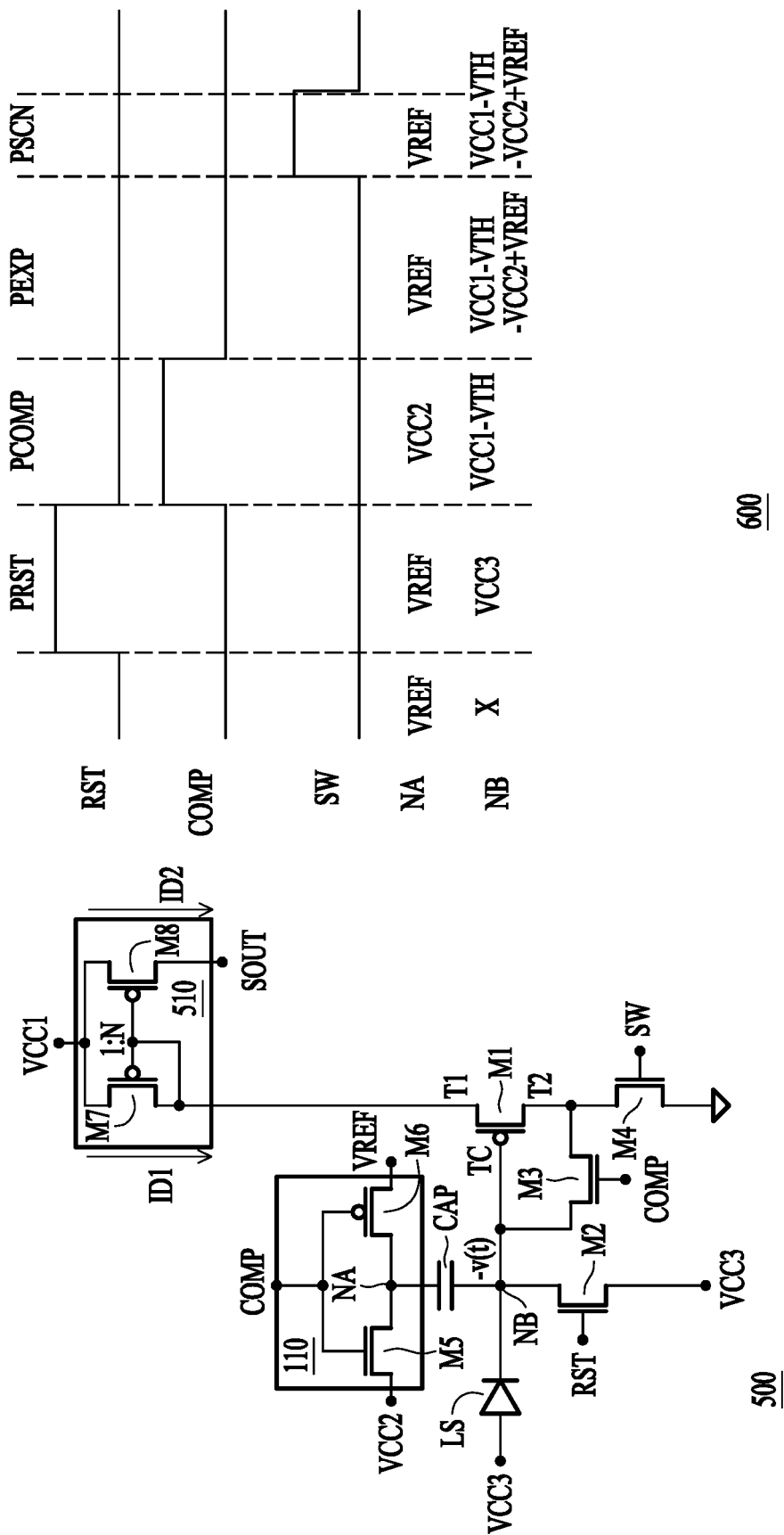

SENSING CIRCUIT IMPROVING MAGNIFICATION IN PIXEL CIRCUIT AND REDUCING INFLUENCE OF SHIFT IN THRESHOLD VOLTAGE PRELIMINARY CLASS

CROSS REFERENCE TO RELATED APPLICATIONS

This application claims priority of China Patent Application No. 202111618172.1, filed on Dec. 27, 2021, the entirety of which is incorporated by reference herein.

BACKGROUND OF THE INVENTION

Field of the Invention

The present disclosure relates to a sensing circuit, and more particularly it relates to a sensing circuit that improves the magnification in a pixel circuit and reduces the influence of a shift in threshold voltage.

Description of the Related Art

Image sensors mainly use an Active Pixel Sensor (APS) to serve as a communication interface between a light sensor and a back-end reading system, and pixel circuits often use a source follower to transmit the signal changes generated by the light sensor to the back-end reading system. If the light sensor is placed in a low-light environment, the signal read by the back-end reading system will be quite weak, and the exposure time must be increased to process the data, which is very unfavorable for user experience.

In addition, the thin film transistor (TFT) manufacturing process will be affected by the environment, equipment, and any non-ideal effects, resulting in a shift in the threshold voltage of the thin film transistor, so that different pixels will correspond to different output voltages when they receive signals of the same light intensity. This may cause the back-end reading system to make a wrong determination on the image. Therefore, it is necessary to optimize the magnification of the sensing signal and reduce the influence of threshold voltage drift.

BRIEF SUMMARY OF THE INVENTION

In an embodiment, a detection circuit is provided herein, which includes a first transistor, a second transistor, a third transistor, a light sensor, a capacitor, and a fourth transistor. The first transistor has a control terminal, a first terminal, and a second terminal. The second transistor is coupled to the control terminal. The third transistor is coupled to the control terminal and the second terminal. The light sensor is coupled to the control terminal. The capacitor is coupled to the control terminal. The fourth transistor is coupled to the second terminal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5 is a circuit diagram of a sensing circuit in accordance with another embodiment of the present disclosure;

FIG. 6 is a waveform diagram of the sensing circuit of FIG. 5 in accordance with an embodiment of the present disclosure;

DETAILED DESCRIPTION OF THE INVENTION

Figure 2:
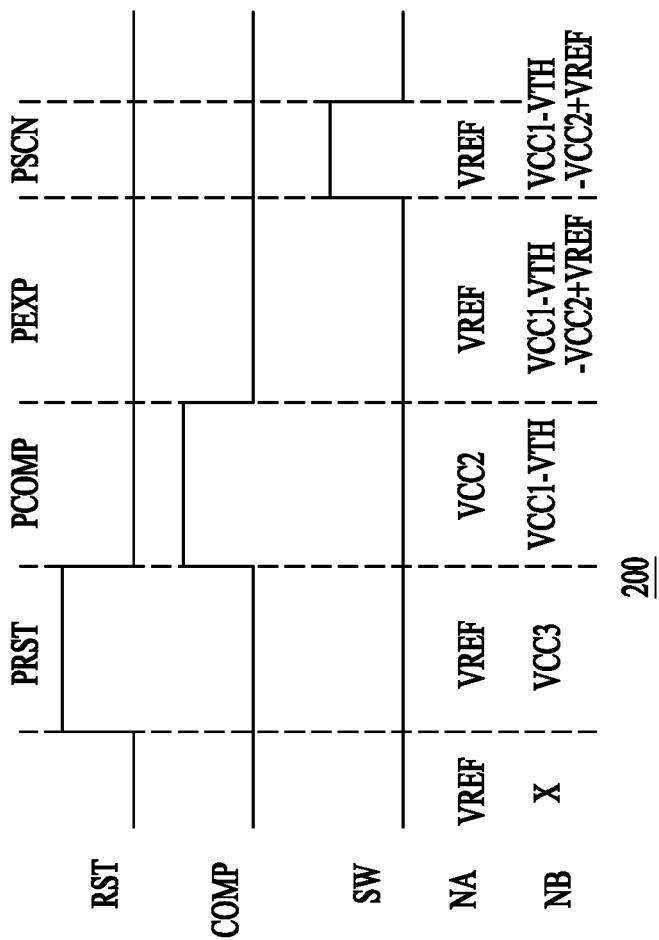
FIG. 2 is a waveform diagram of the sensing circuit of FIG. 1 in accordance with an embodiment of the present disclosure.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Moreover, the formation of a feature on, connected to, and/or coupled to another feature in the disclosure that follows may include embodiments in which the features are formed in direct contact, and may also include embodiments in which additional features may be formed interposing the features, such that the features may not be in direct contact. Furthermore, the terms of joining and connecting may also include the case where both structures are movable or both structures are fixed. In addition, the term "coupled" includes any direct and indirect electrical connection means.

The electrical connection or coupling described in this disclosure may refer to direct connection or indirect connection. In the case of direct connection, the terminals of two devices in a circuit are directly connected or connected to each other through a conducting line. In the case of indirectly connection, there are switches, diodes, capacitors, inductors, resistors, other suitable components or a combination of the components mentioned above between the terminals of two devices in a circuit, but it is not limited thereto.

Figure 1:
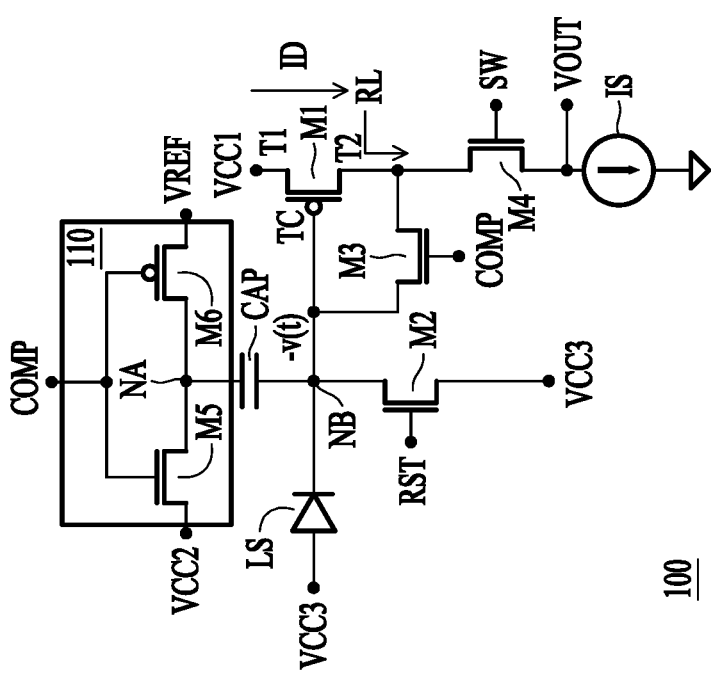
FIG. 1 is a circuit diagram of a sensing circuit in accordance with an embodiment of the present disclosure.

FIG. 1 is a circuit diagram of a sensing circuit in accordance with an embodiment of the present disclosure. As shown in FIG. 1, the sensing circuit 100 includes a capacitor CAP, a first transistor M1, a compensation circuit 110, a second transistor M2, a third transistor M3, a light sensor LS, a fourth transistor M4, and a current source IS. The capacitor CAP is coupled between the first node NA and the second node NB.

The first transistor M1 includes a control terminal TC, a first terminal T1 and a second terminal T2, where the control terminal TC is coupled to the second node NB, and the first terminal T1 receives the first supply voltage VCC1. According to an embodiment of the present disclosure, the first transistor M1 is a P-type transistor. The compensation circuit 110 is coupled between the reference voltage VREF and the second supply voltage VCC2, and the compensation circuit 110 is controlled by the compensation signal COMP. According to an embodiment of the present disclosure, the compensation circuit 110 is configured to provide one of the reference voltage VREF and the second supply voltage VCC2 to the first node NA according to the compensation signal COMP.

The second transistor M2 is coupled between the second node NB and the third supply voltage VCC3, and the second transistor M2 is controlled by the reset signal RST. According to an embodiment of the present disclosure, the second transistor M2 is an N-type transistor. According to an embodiment of the present disclosure, the first supply voltage VCC1 is greater than the second supply voltage VCC2, and the second supply voltage VCC2 is greater than the third supply voltage VCC3.

The third transistor M3 is coupled between the control terminal TC of the first transistor M1 and the second terminal T2, and the third transistor M3 is controlled by the compensation signal COMP. The light sensor LS is coupled between the third supply voltage VCC3 and the second node NB. According to an embodiment of the present disclosure, the third transistor M3 is an N-type transistor.

The fourth transistor M4 is coupled between the second end T2 of the first transistor M1 and the current source IS, and the fourth transistor M4 is controlled by the switch signal SW, where the output voltage VOUT is generated between the fourth transistor M4 and the current source IS. According to an embodiment of the present disclosure, the fourth transistor M4 is an N-type transistor.

As shown in FIG. 1, the compensation circuit 110 includes a fifth transistor M5 and a sixth transistor M6. The fifth transistor M5 is coupled between the second supply voltage VCC2 and the first node NA, and the fifth transistor M5 is controlled by the compensation signal COMP. The sixth transistor M6 is coupled between the reference voltage VREF and the first node NA, and the sixth transistor M6 is controlled by the compensation signal COMP. According to an embodiment of the present disclosure, the fifth transistor M5 is an N-type transistor, and the sixth transistor M6 is a P-type transistor.

According to an embodiment of the present disclosure, the sensing circuit 100 is located in an electronic device. The electronic device may include, but is not limited to, a display device, a backlight device, an antenna device, a sensing device, or a splicing device. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat or ultrasonic waves, but not limited thereto. The electronic device may include passive and active components, such as capacitors, resistors, inductors, diodes, transistors, and the like. The diodes may include light-emitting diodes or photodiodes. The light-emitting diodes may include, for example, organic light-emitting diodes (OLEDs), sub-millimeter light-emitting diodes (mini LEDs), micro light-emitting diodes (micro LEDs), or quantum dot light-emitting diodes (quantum dot LED), but not limited thereto. The splicing device may be, for example, a display splicing device or an antenna splicing device, but not limited thereto. It should be noted that, the electronic device can be any arrangement and combination of the foregoing, but not limited thereto. Hereinafter, the present disclosure will be described by using the display device as the electronic device or the splicing device, but the present disclosure is not limited thereto.

FIG. 2 is a waveform diagram of the sensing circuit of FIG. 1 in accordance with an embodiment of the present disclosure. The following description of the waveform diagram 200 of FIG. 2 will be accompanied with the sensing circuit 100 of FIG. 1 to facilitate detailed description.

According to an embodiment of the present disclosure, the sensing circuit 100 operates in the reset period PRST, the compensation period PCOMP, the exposure period PEXP, and the read period PSCN. Before the sensing circuit 100 operates at the reset period PRST, the reset signal RST, the compensation signal COMP, and the switch signal SW are all at the low logic level, so that the first node NA is in the reference voltage VREF, and the voltage level of the second node NB is unknown.

According to an embodiment of the present disclosure, when the sensing circuit 100 operates in the reset period PRST, the reset signal RST is at a high logic level to turn on the second transistor M2, so that the second transistor M2 supplies the third voltage VCC3 to the second node NB.

According to another embodiment of the present disclosure, when the sensing circuit 100 operates in the compensation period PCOMP, the reset signal RST returns to the low logic level and the compensation signal COMP is at the high logic level. Therefore, the third transistor M3 and the fifth transistor M5 are turned on according to the compensation signal COMP at the high logic level, and the sixth transistor M6 is turned off according to the compensation signal COMP at the high logic level.

When the sensing circuit 100 operates at the compensation period PCOMP, the third transistor M3 couples the second terminal T2 of the first transistor M1 to the control terminal TC of the first transistor M1, so that the voltage of the second node NB is equal to (VCC1−VTH), where VTH is the threshold voltage of the first transistor M1. The fifth transistor M5 provides the second supply voltage VCC2 to the first node NA, so that the voltage of the first node NA is the second supply voltage VCC2. According to an embodiment of the present disclosure, the threshold voltage VTH of the first transistor M1 is stored in the capacitor CAP during the compensation period PCOMP.

According to another embodiment of the present disclosure, when the sensing circuit 100 operates in the exposure period PEXP, the compensation signal COMP returns to the low logic level, so that the third transistor M3 and the fifth transistor M5 are turned off, and the sixth transistor M6 is turned on. The sixth transistor M6 provides the reference voltage VREF to the first node NA, so that the voltage of the first node NA is at the reference voltage VREF. Since the capacitor CAP stores the voltage in the compensation period PCOMP, the voltage of the second node NB is shown in Eq. 1:

$$VCC1-VTH-VCC2+VREF \quad (Eq.\ 1)$$

At this time, the current ID flowing through the first transistor M1 is shown in Eq. 2:

$$ID=k(VCC1-(VCC1-VTH-VCC2+VREF)-VTH)^2 \quad (Eq.\ 2)$$

After the Eq. 2 is sorted out, the current ID flowing through the first transistor M1 is as shown in the Eq. 3:

$$ID=k(VCC2-VREF)^2 \quad (Eq.\ 3)$$

As shown in Eq. 3, after the threshold voltage VTH of the first transistor M1 is stored in the capacitor CAP during the compensation period PCOMP, the current ID flowing through the first transistor M1 is no longer related to the threshold voltage VTH, so that the drift of the threshold voltage VTH no longer affects the current ID flowing through the first transistor M1.

It is assumed that the first transistor M1 is an ideal transistor. The second terminal T2 of the first transistor M1 has an output impedance R L, and the product of the transconductance gm and the output impedance RL of the first transistor M1 is the alternating current (AC) voltage gain $A_v$ of the first transistor M1, where the AC voltage gain $A_v$ is shown in Eq. 4:

$$A_v=g_m \times RL \quad (Eq.\ 4)$$

According to an embodiment of the present disclosure, since the transconductance gm of the first transistor M1 is positively correlated with the current ID flowing through the first transistor M1 (as shown in Eq. 3), plus the current ID flowing through the first transistor M1 is no longer affected by the threshold voltage VTH, the AC voltage gain $A_v$ is not affected by the threshold voltage VTH of the first transistor M1, and the AC voltage gain $A_v$ is far greater than 1.

According to an embodiment of the present disclosure, during the exposure period PEXP, after the light sensor LS senses light, a sensing signal −v(t) is generated at the second node NB, so that the current ID flowing through the first transistor M1 is shown in Eq. 5:

$$ID=k(VCC2-VREF-v(t))^2 \quad (Eq.\ 5)$$

According to another embodiment of the present disclosure, when the sensing circuit 100 operates in the read period PSCN, the switch signal SW is at the high logic level, so that the fourth transistor M4 is turned on. Next, the fourth transistor M4 amplifies the sensing signal −v(t) sensed by the light sensor LS through the AC voltage gain $A_v$ to output the output voltage VOUT.

Figure 3:
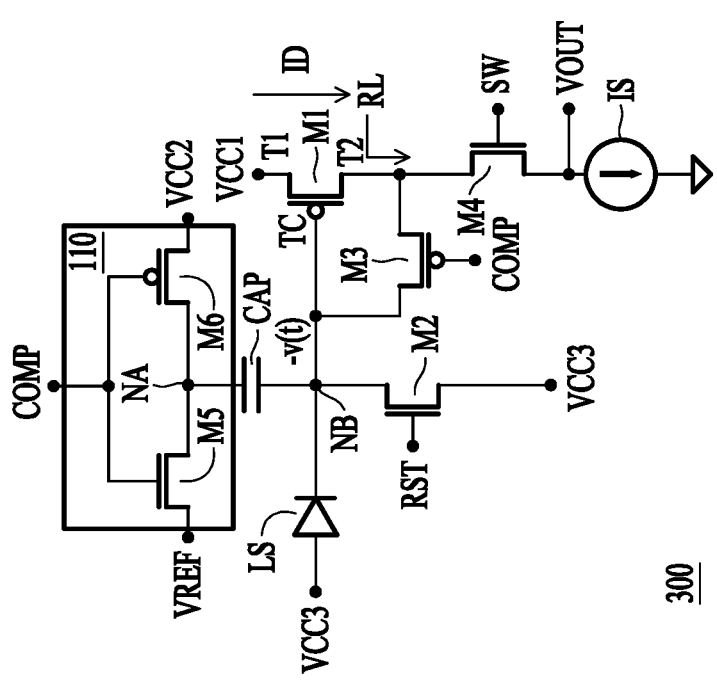
FIG. 3 is a circuit diagram of a sensing circuit in accordance with another embodiment of the present disclosure.

FIG. 3 is a circuit diagram of a sensing circuit in accordance with another embodiment of the present disclosure. Comparing the sensing circuit 300 of FIG. 3 with the sensing circuit 200 of FIG. 2, the third transistor M3 of the sensing circuit 300 is a P-type transistor, the fifth transistor M5 is coupled between the reference voltage VREF and the first node NA, and the sixth transistor M6 is coupled between the first node NA and the second supply voltage VCC2.

Figure 4:
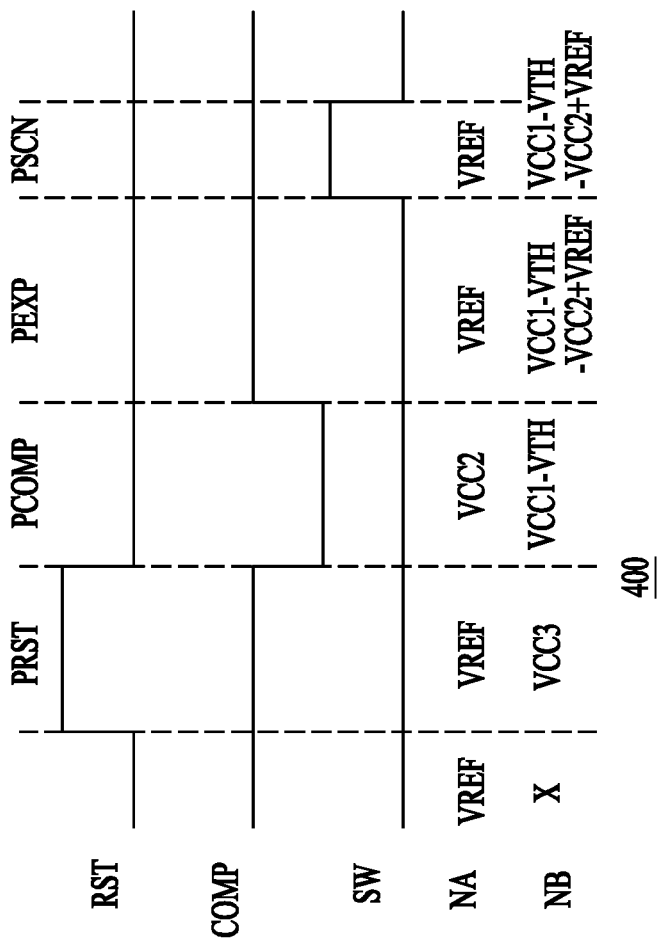
FIG. 4 is a waveform diagram of the sensing circuit of FIG. 3 in accordance with an embodiment of the present disclosure.

FIG. 4 is a waveform diagram of the sensing circuit of FIG. 3 in accordance with an embodiment of the present disclosure. Comparing the waveform diagram 400 of FIG. 4 with the waveform diagram 200 of FIG. 2, since the third transistor M3 of the sensing circuit 300 is a P-type transistor, the compensation signal COMP is at the low logic level during the compensation period PCOMP, which at the high logic level in other periods.

FIG. 5 is a circuit diagram of a sensing circuit in accordance with another embodiment of the present disclosure. Comparing the sensing circuit 500 of FIG. 5 with the sensing circuit 200 of FIG. 2, the fourth transistor M4 of the sensing circuit 500 is coupled to the ground, and the sensing circuit 500 further includes a first current mirror 510. The first current mirror 510 is coupled to the first terminal T1 of the first transistor M1.

As shown in FIG. 5, the first current mirror 510 includes a seventh transistor M7 and an eighth transistor M8, where the seventh transistor M7 and the eighth transistor M8 are P-type transistors. The seventh transistor M7 is electrically connected as a diode which is coupled between the first supply voltage VCC1 and the first terminal T1 of the first transistor M1. The control terminal of the eighth transistor M8 is coupled to the first terminal T1 of the first transistor M1 and the control terminal of the seventh transistor M7. The first terminal of the eighth transistor M8 is coupled to the first supply voltage VCC1. The output signal SOUT is generated at the second terminal of the eight transistors M8.

According to an embodiment of the present disclosure, the width-to-length ratio of the eighth transistor M8 is N times of that of the seventh transistor M7, so the second current ID2 flowing through the eighth transistor M8 is N times of the first current ID1 flowing through the seven transistors M7. In other words, the first current ID1 generated by the first transistor M1 is amplified by N times to generate the second current ID2 through the first current mirror 510, and the second current ID2 is output as the output signal SOUT.

FIG. 6 is a waveform diagram of the sensing circuit of FIG. 5 in accordance with an embodiment of the present disclosure. Comparing the waveform diagram 600 of FIG. 6 with the waveform diagram 200 of FIG. 2, the detail of the waveform diagram 600 is not repeated herein since the waveform diagram 600 is the same as the waveform diagram 200.

Figures 7, 8:
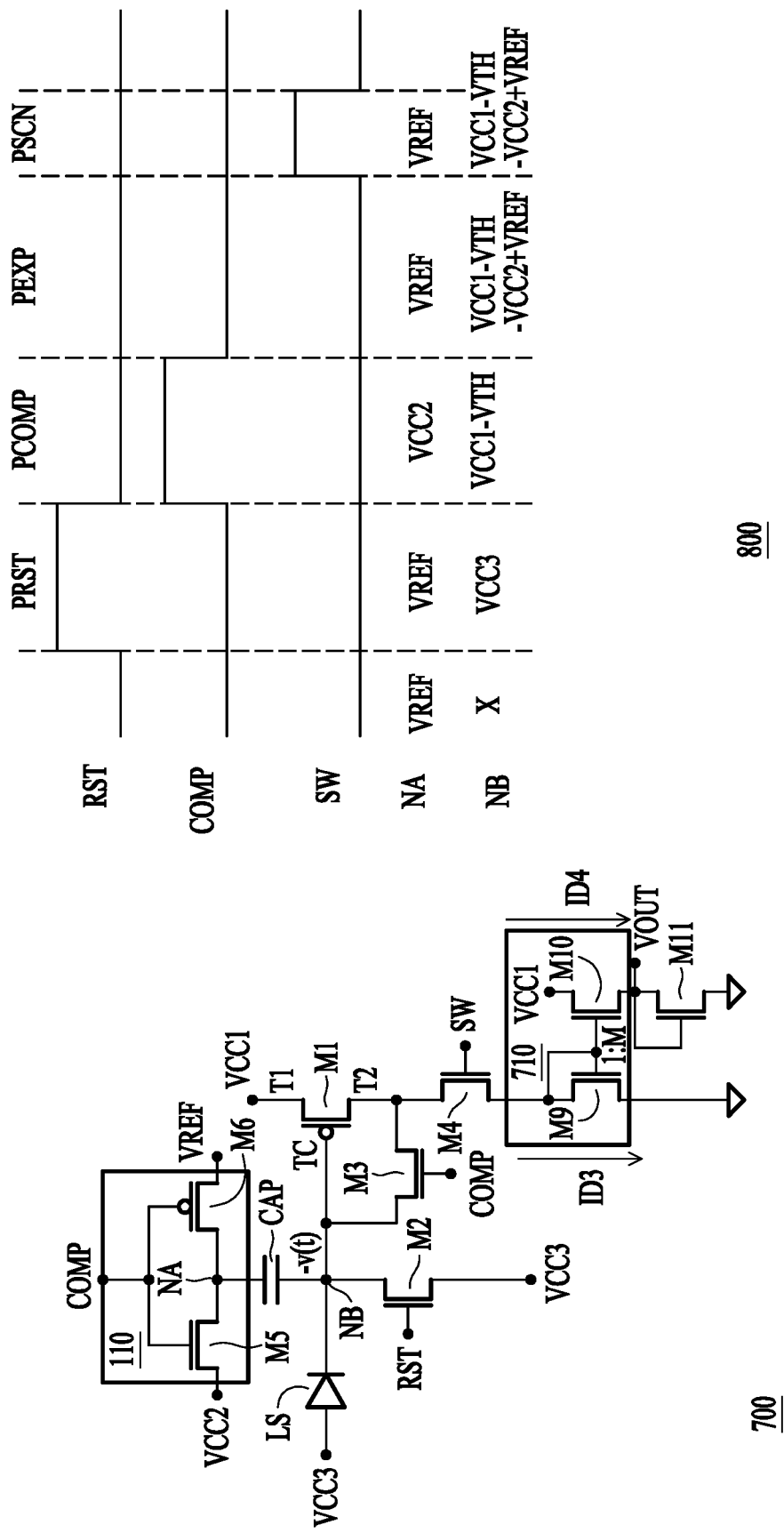
FIG. 7 is a circuit diagram of a sensing circuit in accordance with another embodiment of the present disclosure.
FIG. 8 is a waveform diagram of the sensing circuit of FIG. 7 in accordance with an embodiment of the present disclosure.

FIG. 7 is a circuit diagram of a sensing circuit in accordance with another embodiment of the present disclosure. Comparing the sensing circuit 700 of FIG. 7 with the sensing circuit 200 of FIG. 2, the first terminal T1 of the first transistor M1 receives the first supply voltage VCC1, and the sensing circuit 700 further includes a second current mirror 710 and an eleventh transistor M11, where the fourth transistor M4 is coupled to the second current mirror 710.

As shown in FIG. 7, the second current mirror 710 includes a ninth transistor M9 and a tenth transistor M10, where the ninth transistor M9 and the tenth transistor M10 are N-type transistors. The ninth transistor M9 is electrically connected as a diode which is coupled between the fourth transistor M4 and the ground. The control terminal of the tenth transistor M10 is coupled to the fourth transistor M4 and the control terminal of the ninth transistor M9, the first terminal of the tenth transistor M10 is coupled to the first supply voltage VCC1, and the second terminal of the tenth transistor M10 generates the output voltage VOUT.

The eleventh transistor M11 is electrically connected as a diode which is coupled between the output voltage VOUT and the ground. According to an embodiment of the present disclosure, the eleventh transistor M11 is an N-type transistor. According to an embodiment of the present disclosure, the width-to-length ratio of the ninth transistor M9 is M times of that of the tenth transistor M10, so that the third current ID3 flowing through the ninth transistor M9 is M times of the fourth current ID4 flowing through the ten transistor M10. In other words, the second current mirror 710 may generate a fourth current ID4 flowing through the eleventh transistor M11 by amplifying the third current ID3 generated by the first transistor M1 by M times as the output voltage VOUT.

FIG. 8 is a waveform diagram of the sensing circuit of FIG. 7 in accordance with an embodiment of the present disclosure. Comparing the waveform diagram 800 of FIG. 8 with the waveform diagram 200 of FIG. 2, the detail is not repeated herein since the waveform diagram 800 is identical to the waveform diagram 200.

Figure 9:
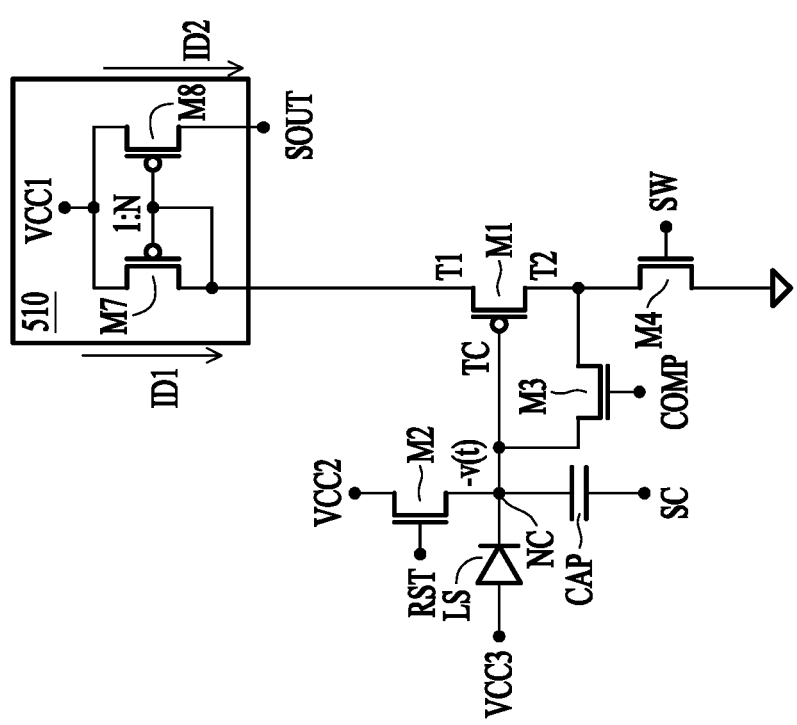
FIG. 9 is a circuit diagram of a sensing circuit in accordance with another embodiment of the present disclosure.

FIG. 9 is a circuit diagram of a sensing circuit in accordance with another embodiment of the present disclosure. As shown in FIG. 9, the sensing circuit 900 includes a capacitor CAP, a first transistor M1, a second transistor M2, a third transistor M3, a light sensor LS, a fourth transistor M4, and a first current mirror 510. The capacitor CAP is coupled between the third node NC and the control signal SC. According to an embodiment of the present disclosure, the control signal SC is switched between the third supply voltage VCC3 and the reference voltage VREF. According to an embodiment of the present disclosure, the reference voltage VREF exceeds the third supply voltage VCC3.

The first transistor M1 includes a control terminal TC, a first terminal T1, and a second terminal T2, where the control terminal TC is coupled to the third node NC. According to an embodiment of the present disclosure, the first transistor M1 is a P-type transistor. The second transistor M2 is coupled between the second supply voltage VCC2 and the third node NC, and the second transistor M2 is controlled by the reset signal RST. According to an embodiment of the present disclosure, the second transistor M2 is an N-type transistor.

The third transistor M3 is coupled between the control terminal TC and the second terminal T2 of the first transistor M1, and the third transistor M3 is controlled by the compensation signal COMP. The light sensor LS is coupled between the third supply voltage VCC3 and the third node NC. According to an embodiment of the present disclosure, the third transistor M3 is an N-type transistor. The fourth transistor M4 is coupled between the second terminal T2 of the first transistor M1 and the ground, and the fourth transistor M4 is controlled by the switch signal SW. According to an embodiment of the present disclosure, the fourth transistor M4 is an N-type transistor.

The first current mirror 510 is coupled between the first supply voltage VCC1 and the first terminal T1 of the first transistor M1, and is configured to amplify the first current ID1 flowing through the first transistor M1 by N times to be the second current ID2 that is output as the output signal SOUT. The first current mirror 510 has been described in detail in the description of FIG. 5 which will not be repeated herein. According to an embodiment of the present disclosure, the first supply voltage VCC1 is greater than the second supply voltage VCC2, and the second supply voltage VCC2 is greater than the third supply voltage VCC3.

Figure 10:
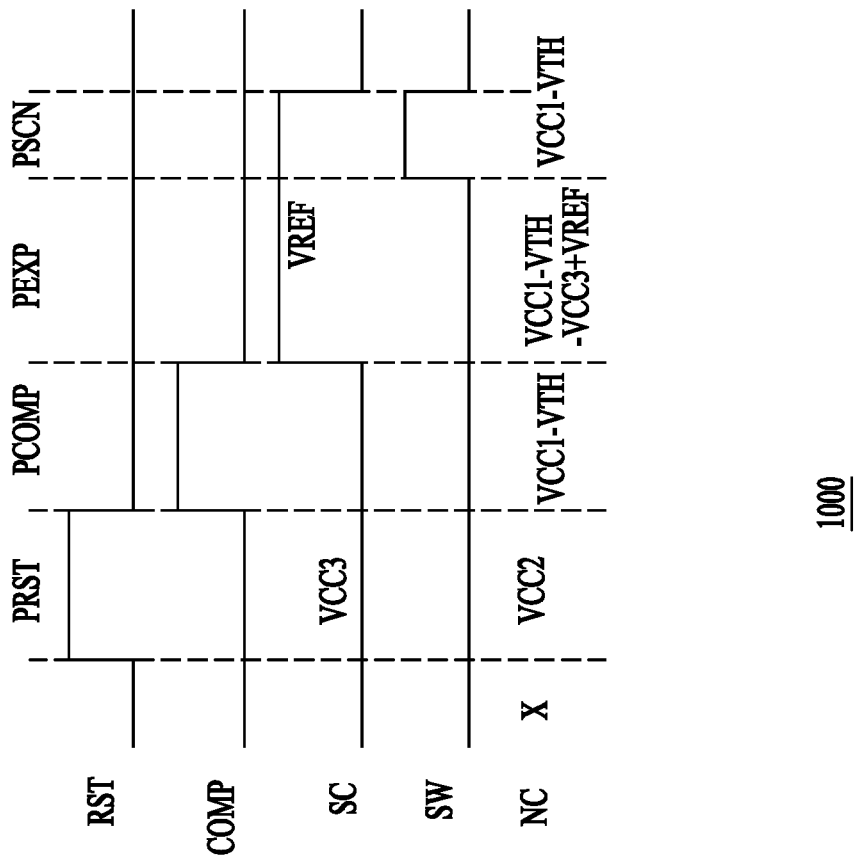
FIG. 10 is a waveform diagram of the sensing circuit of FIG. 9 in accordance with an embodiment of the present disclosure.

FIG. 10 is a waveform diagram of the sensing circuit of FIG. 9 in accordance with an embodiment of the present disclosure. The following description of the waveform diagram 1000 of FIG. 10 will be accompanied with the sensing circuit 900 of FIG. 9 for detailed explanation.

According to an embodiment of the present disclosure, before the sensing circuit 900 operates, the reset signal RST, the compensation signal COMP, and the switch signal SW are at the low logic level, and the control signal SC is at the third supply voltage VCC3. Therefore, the second transistor M2, the third transistor M3, and the fourth transistor M4 are both turned off, and the voltage level of the third node NC is unknown.

According to an embodiment of the present disclosure, when the sensing circuit 900 operates in the reset period PRST, the reset signal RST is at the high logic level to turn on the second transistor M2, so that the second transistor M2 supplies the second voltage VCC2 to the third node NC. In other words, during the reset period PRST, the voltage of the third node NC is the second supply voltage VCC2.

According to another embodiment of the present disclosure, when the sensing circuit 900 operates in the compensation period PCOMP, the reset signal RST returns to the low logic level and the compensation signal COMP is at the high logic level. Therefore, the third transistor M3 is turned on according to the compensation signal COMP which is at the high logic level. The third transistor M3 couples the second terminal T2 to the control terminal TC of the first transistor M1, so that the voltage of the third node NC is (VCC1−VTH), where VTH is the threshold voltage of the first transistor M1. According to an embodiment of the present disclosure, the threshold voltage VTH of the first transistor M1 is stored in the capacitor CAP during the compensation period PCOMP.

According to another embodiment of the present disclosure, when the sensing circuit 900 operates at the exposure period PEXP, the compensation signal COMP returns to the low logic level so that the third transistor M3 is turned off, and the control signal SC is changed from the third supply voltage VCC3 to the reference voltage VREF. Since the capacitor CAP stores the voltage during the compensation period PCOMP, the voltage of the third node NC during the exposure period PEXP is shown in Eq. 6:

$$VCC1-VTH-VCC3+VREF \qquad (Eq.\ 6)$$

At this time, the first current ID1 flowing through the first transistor M1 is sorted as shown in Eq. 7:

$$ID1=k(VCC3-VREF)^2 \qquad (Eq.\ 7)$$

As shown in Eq. 7, after the threshold voltage VTH of the first transistor M1 is stored in the capacitor CAP during the compensation period PCOMP, the first current ID1 flowing through the first transistor M1 is no longer related to the threshold voltage VTH, so the drift of the threshold voltage VTH no longer affects the first current ID flowing through the first transistor M1.

According to an embodiment of the present disclosure, after the light sensor LS senses the light during the exposure period PEXP, a sensing signal −v(t) is generated at the third node NC, so that the first transistor M1 flows through the first current ID1 is shown in Eq. 8:

$$ID1 = k(VCC3 - VREF - v(t))^2 \qquad \text{(Eq. 8)}$$

According to another embodiment of the present disclosure, when the sensing circuit 900 operates in the read period PSCN, the switch signal SW is at the high logic level, so that the fourth transistor M4 is turned on. Then, the first current mirror 510 amplifies the first current ID1 by N times to be the second current ID2, and outputs the second current ID2 as the output signal SOUT. Therefore, the signal generated at the third node NC is amplified accordingly.

According to an embodiment of the present disclosure, since the sensing circuit 900 has fewer transistors, the pixel density of the pixel circuit, i.e., pixels per inch (PPI), can be increased.

Figure 11:
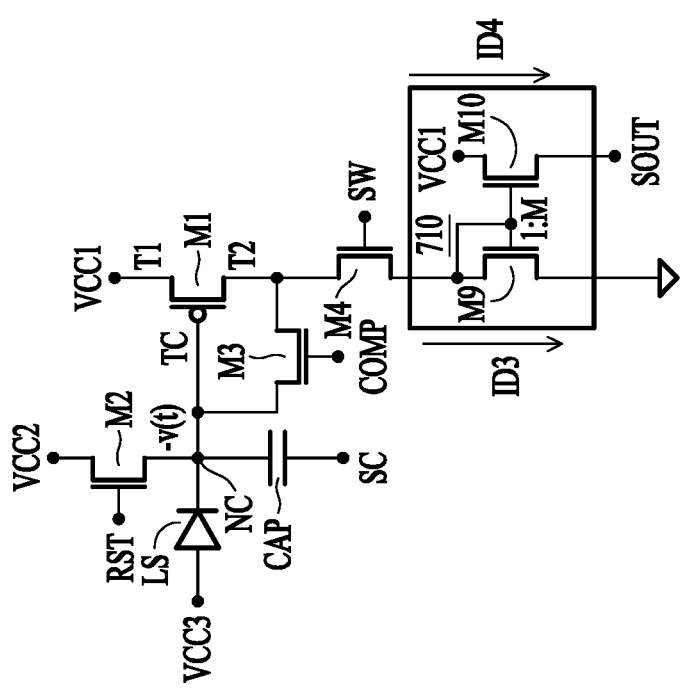
FIG. 11 is a circuit diagram of a sensing circuit in accordance with another embodiment of the present disclosure.

FIG. 11 is a circuit diagram of a sensing circuit in accordance with another embodiment of the present disclosure. Comparing the sensing circuit 1100 of FIG. 11 with the sensing circuit 900 of FIG. 9, the first current mirror 510 of the sensing circuit 900 is replaced with the second current mirror 710, the second current mirror 710 is coupled to the fourth transistor M4, and the first terminal T1 of the first transistor M1 is coupled to the first supply voltage VCC1. The second current mirror 710 is described in detail in the description of FIG. 7 which is not repeated herein.

As shown in FIG. 11, the second current mirror 710 amplifies the third current ID3 flowing through the first transistor M1 by M times to be the fourth current ID4, and outputs the fourth current ID4 as the output signal S OUT.

Figure 12:
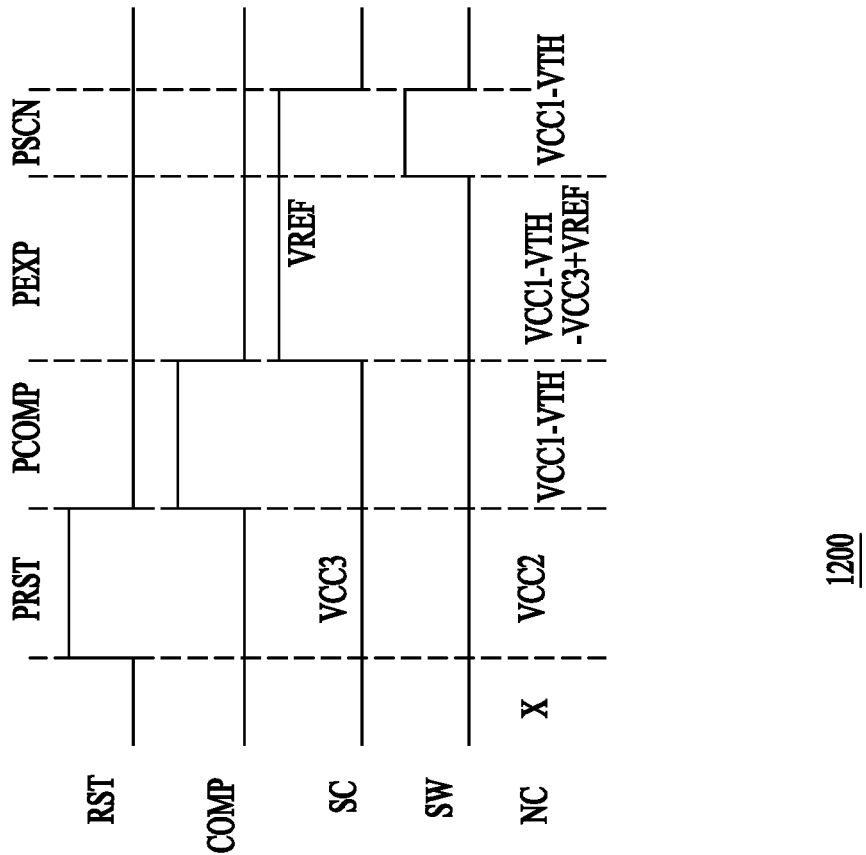
FIG. 12 is a waveform diagram of the sensing circuit of FIG. 11 in accordance with an embodiment of the present disclosure.

FIG. 12 is a waveform diagram of the sensing circuit of FIG. 11 in accordance with an embodiment of the present disclosure. Comparing the waveform diagram 1200 of FIG. 12 with the waveform diagram 1000 of FIG. 10, the detail of the waveform diagram 1200 is not repeated herein since the waveform diagram 1200 is the same as the waveform diagram 1000.

A sensing circuit is provided herein, which stores the threshold voltage of the transistor by a capacitor to eliminate the influence of the threshold voltage on a current flowing through the transistor and on the AC voltage gain. In addition, the present invention reduces the number of transistors in the sensing circuit by optimizing the transistors of the sensing circuit, and helps to increase the pixel density.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A sensing circuit, comprising:
   a first transistor, comprising a control terminal, a first terminal, and a second terminal;
   a second transistor, coupled to the control terminal;
   a third transistor, coupled to the control terminal and the second terminal;
   a light sensor, coupled to the control terminal;
   a capacitor, coupled to the control node;
   a fourth transistor, coupled to the second terminal; and
   a compensation circuit, coupled to the capacitor, wherein the compensation circuit provides the third supply voltage and the reference voltage, wherein the compensation circuit further comprises:
   a fifth transistor; and
   a sixth transistor, wherein a control terminal of the fifth transistor is coupled to a control terminal of the sixth transistor, and a first terminal of the fifth transistor and a second terminal of the sixth transistor are coupled to the capacitor.

2. The sensing circuit as defined in claim 1, wherein the first transistor is a P-type transistor.

3. The sensing circuit as defined in claim 1, wherein the third transistor is a P-type transistor.

4. The sensing circuit as defined in claim 1, wherein the third transistor is an N-type transistor.

5. The sensing circuit as defined in claim 4, wherein the first terminal of the first transistor is supplied with a first supply voltage and the light sensor is coupled between a second supply voltage and the control terminal of the first transistor.

6. The sensing circuit as defined in claim 5, wherein the sensing circuit sequentially operates in a reset period, a compensation period, an exposure period, and a read period.

7. The sensing circuit as defined in claim 6, wherein when the sensing circuit operates in the reset period, a reset signal is configured to turn on the second transistor so that the second transistor supplies the second voltage to the control terminal of the first transistor.

8. The sensing circuit as defined in claim 7, wherein when the sensing circuit operates in the compensation period, the second transistor is turned off, the third transistor is turned on to couple the control terminal to the second terminal, and a third supply voltage is provided to the capacitor.

9. The sensing circuit as defined in claim 8, wherein when the sensing circuit operates in the compensation period, a threshold voltage of the first transistor is stored in the capacitor.

10. The sensing circuit as defined in claim 9, wherein when the sensing circuit operates in the exposure period, the third transistor is turned off, a reference voltage is provided to the capacitor, and the light sensor senses light to generate a sensing signal at the control terminal.

11. The sensing circuit as defined in claim 1, wherein the fifth transistor provides the third supply voltage to the capacitor during the compensation period, and the sixth transistor provides the reference voltage to the capacitor during the exposure period.

12. The sensing circuit as defined in claim 1, wherein the sixth transistor provides the third supply voltage to the capacitor during the compensation period, and the fifth transistor provides the reference voltage to the capacitor during the exposure period.

13. The sensing circuit as defined in claim 1, wherein the fifth transistor is an N-type transistor, and the sixth transistor is a P-type transistor.

14. The sensing circuit as defined in claim 10, wherein the capacitor is coupled to a control signal, wherein the control signal switches between the third supply voltage and the reference voltage, wherein the control signal is at the third supply voltage during the compensation period and the control signal is at the reference voltage during the exposure period, wherein the reference voltage exceeds the supply voltage.

15. The sensing circuit as defined in claim 10, wherein when the sensing circuit operates in the read period, the fourth transistor is turned on to generate an output signal.

16. The sensing circuit as defined in claim 15, wherein the output signal is generated by amplifying the sensing signal by an AC gain of the first transistor.

17. The sensing circuit as defined in claim 15, further comprising:
   a current mirror, coupled to the first terminal of the first transistor and amplifying a first current flowing through the first transistor by N times to generate a second current, wherein the output signal is the second current.

18. The sensing circuit as defined in claim 15, further comprising:
   a current mirror, coupled to the second terminal of the fourth transistor and amplifying a first current flowing through the first transistor by M times to generate a second current, wherein the output signal is the second current.

* * * * *